United States Patent
Shim et al.

(10) Patent No.: US 10,025,024 B2
(45) Date of Patent: Jul. 17, 2018

(54) DISPLAY DEVICE

(71) Applicant: Samsung Display Co., Ltd., Yongin-si, Gyeonggi-do (KR)

(72) Inventors: Sung-kyu Shim, Seoul (KR); Dohun Kim, Changwon-si (KR); Hyoung-joo Kim, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 27 days.

(21) Appl. No.: 15/163,602

(22) Filed: May 24, 2016

(65) Prior Publication Data

US 2017/0090112 A1 Mar. 30, 2017

(30) Foreign Application Priority Data

Sep. 30, 2015 (KR) .................. 10-2015-0138101

(51) Int. Cl.
*F21V 7/04* (2006.01)
*F21V 8/00* (2006.01)

(52) U.S. Cl.
CPC .......... *G02B 6/0088* (2013.01); *G02B 6/005* (2013.01); *G02B 6/0045* (2013.01); *G02B 6/0068* (2013.01)

(58) Field of Classification Search
CPC .... G02B 6/0088; G02B 6/0045; G02B 6/005; G02B 6/0068
See application file for complete search history.

(56) References Cited

U.S. PATENT DOCUMENTS

| | | | | |
|---|---|---|---|---|
| 2007/0146616 A1* | 6/2007 | Nouchi | ................. | G02F 1/1333 349/155 |
| 2013/0258707 A1* | 10/2013 | Iwasaki | ................. | G02B 6/0041 362/607 |
| 2013/0321740 A1* | 12/2013 | An | ................. | H05K 5/0217 349/58 |
| 2015/0323826 A1* | 11/2015 | Hsiao | ................. | G02F 1/133308 349/58 |

FOREIGN PATENT DOCUMENTS

| | | | |
|---|---|---|---|
| JP | 2010217702 | * | 9/2010 |
| KR | 10-2009-0100949 A | | 9/2009 |
| KR | 10-0951598 B1 | | 4/2010 |
| KR | 10-2013-0143213 A | | 12/2013 |
| KR | 10-2014-0007202 A | | 1/2014 |
| KR | 10-2015-0013979 A | | 2/2015 |

* cited by examiner

*Primary Examiner* — Laura Gudorf
(74) *Attorney, Agent, or Firm* — Lewis Roca Rothgerber Christie LLP

(57) ABSTRACT

A display device includes a display panel, a backlight unit, and support members. The display panel displays an image, and a first edge section, a middle section, and a second edge section are defined on the display panel. The backlight unit outputs light toward the display panel. The support members are disposed between the display panel and the backlight unit corresponding to the first and second edge sections, and the support members space the display panel from the backlight unit. A spacing distance between the display panel and the backlight in each of the first and second edge sections is greater than a spacing distance between the display panel and the backlight unit in the middle section.

19 Claims, 7 Drawing Sheets

DISPLAY DEVICE

CROSS-REFERENCE TO RELATED APPLICATION

This U.S. non-provisional patent application claims priority to and the benefit of Korean Patent Application No. 10-2015-0138101, filed on Sep. 30, 2015, the entire content of which is hereby incorporated by reference.

BACKGROUND

1. Field

The present disclosure herein relates to a display device, and more particularly, to a display device including a backlight unit.

2. Description of the Related Art

Recently, various display devices applied to mobile information processing devices such as tablet personal computers (PCs) and laptop PCs have been developed, and methods for reducing the volume and weight of the display device as well as methods for improving the display quality of the display device are being studied. In particular, when the display device includes a backlight assembly, methods for reducing the volume and weight of the display device in relation to a structure of the backlight assembly are being studied.

SUMMARY

An aspect of an embodiment of the present disclosure is directed toward a display device having enhanced displaying quality and a reduced volume.

An embodiment of the inventive concept provides a display device (apparatus) including a display panel, a backlight unit, and support members. The display panel displays an image, and a first edge section, a middle section, and a second edge section are defined (e.g., sequentially defined along a direction) on the display panel. The backlight unit outputs light toward the display panel. The support members are disposed between the display, panel and the backlight unit corresponding to the first and second edge sections, and space the display panel from the backlight unit. A spacing distance between the display panel and the backlight in each of the first and second edge sections is greater than a spacing distance between the display panel and the backlight unit in the middle section.

In an embodiment, the backlight unit may include: a light emitting unit configured to emit the light; a light guide plate configured to guide the light provided from the light emitting unit; and optical sheets disposed between the display panel and the light guide plate. Also, spacing distances between the display panel and the light guide plate in the first and second edge sections may be greater than a spacing distance between the display panel and the light guide plate in the middle section by utilizing a corresponding support member from among the support members.

In an embodiment, the display panel may include: a first edge part corresponding to the first edge section; a second edge part corresponding to the second edge section; and a middle part corresponding to the middle section. Also, the support members may include: a first support member spacing the first edge part from the light guide plate; and a second support member spacing the second edge part from the light guide plate.

In an embodiment, the first support member may include a first inclined surface inclined toward the middle part when viewed in a side view (i.e., when viewed from its side), and the second support member may include a second inclined surface inclined toward the middle part when viewed in a side view.

In an embodiment, when viewed in a side view, each of the first edge part and the second edge part may have a shape bent with respect to the middle part.

In an embodiment, the light guide plate may include: a first light guide part overlapping the first edge part; a second light guide part overlapping the second edge part; and a middle light guide part overlapping the middle part. Also, when viewed in a side view, each of the first and second light guide parts may have a shape bent with respect to the middle light guide part.

In an embodiment, the display device may further include a receiving member. Also the display panel, when viewed in a side view, may be convexly bent toward a bottom part of the receiving member, and the light guide plate, when viewed in a side view, may be convexly bent toward the display panel.

In an embodiment, the display device may further include a receiving member. Also the display panel and the light guide plate, when viewed in a side view, may have shapes convexly bent in a direction away from the bottom part of the receiving member, and a radius of curvature of the display panel may be greater than that of the light guide plate.

In an embodiment, the display device may further include a receiving member. Also the display panel and the light guide plate, when viewed in a side view, may have shapes convexly bent toward the bottom part of the receiving member, and a radius of curvature of light guide plate may be greater than that of the display panel.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, exemplary embodiments of the present disclosure will be described in more detail with reference to the accompanying drawings. The objects, features, and advantages of the inventive concept will be understood without difficulties through embodiments below related to the accompanying drawings. The inventive concept may, however, be embodied in many alternate forms and should not be construed as limited to only the embodiments set forth herein. Rather, these embodiments are provided so that this disclosure will be thorough and complete, and will fully convey the scope of the present disclosure to those skilled in the art. Accordingly, the scope of the present disclosure should not be construed as limited to the embodiments set forth herein. Further, like reference numerals in the following embodiments and drawings denote like elements.

Also, though the terms "first", "second", etc. are used herein for distinguishing one element from another element, these elements should not be limited by these terms. Also, it will be understood that when a film, a region, a component, etc. is referred to as being 'over' or "on" another layer, region, or plate, it can be directly on the other layer, region, or plate, or intervening layer(s), region(s), or plate(s) may also be present. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

Figure 1:
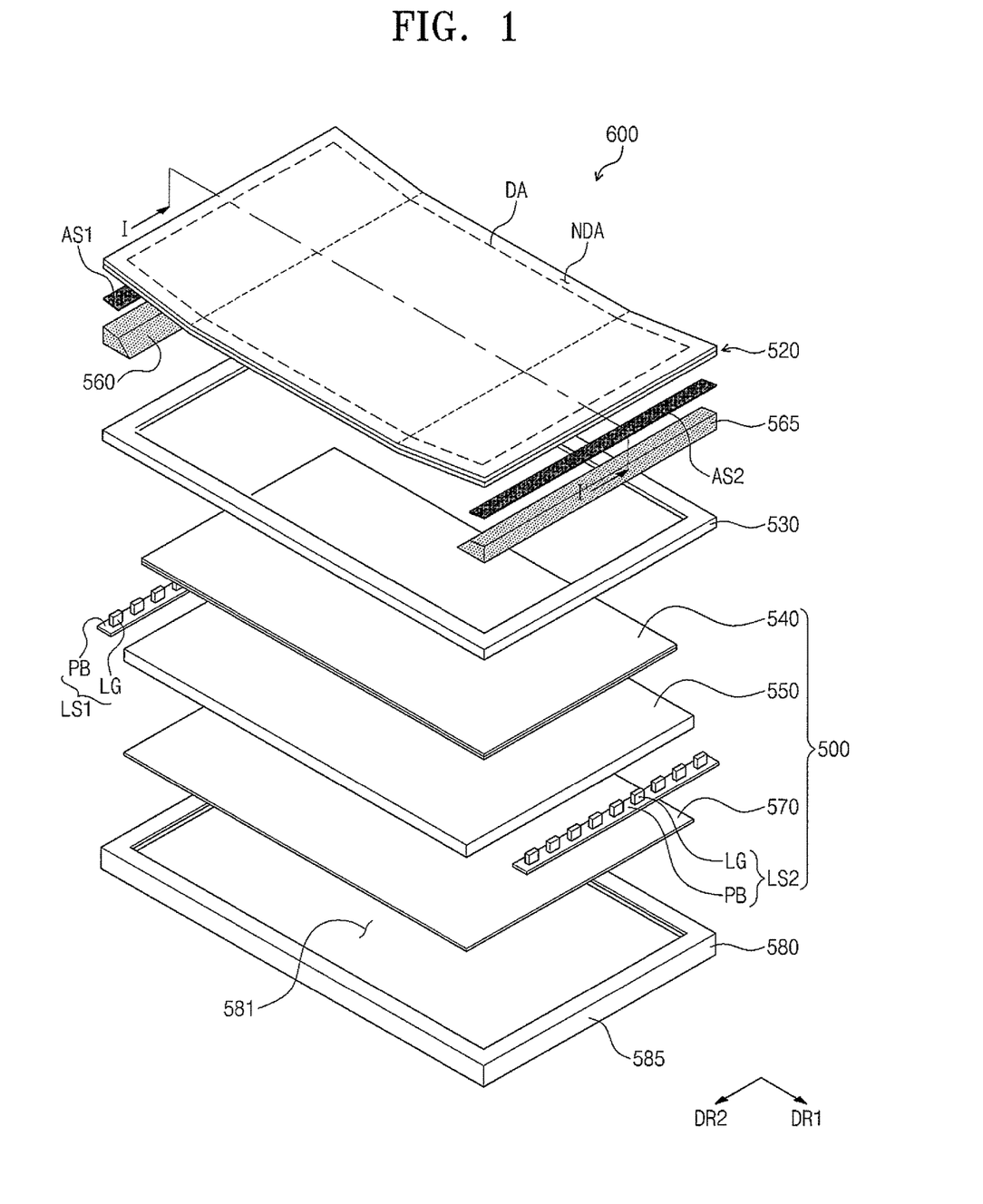
FIG. 1 is an exploded perspective view illustrating a display device according to an embodiment of the inventive concept.

FIG. 1 is an exploded perspective view illustrating a display device 600 according to an embodiment of the inventive concept.

Referring to FIG. 1, the display device 600 has a display area DA and a non-display area NDA surrounding the display area DA. The display device 600 displays an image through the display area DA.

In this embodiment, the display device 600 may be a liquid crystal display device. The display device 600 includes a receiving member 580, a display panel 520, a backlight unit 500, a mold frame 530, a first support member 560, a second support member 565, a first adhesion member AS1 and a second adhesion member AS2.

The receiving member 580 includes a bottom part 581 and a plurality of side walls 585 extending from the bottom part 581 to receive the display panel 520 and the backlight unit 500. In this embodiment, each of the plurality of side walls 585 extends perpendicular (normal) to the bottom part 581 and may have a shape bent parallel to the bottom part 581 (e.g., a "C" or "[" shape).

In this embodiment, the display panel 520 may be a liquid crystal panel, and the display panel 520 includes two display substrates and a liquid crystal layer interposed between the two display substrates.

In this embodiment, the display panel 520 may have a rectangular shape. Accordingly, the display panel 520 may have long sides in a first direction DR1, and short sides in a second direction DR2 perpendicular to the first direction DR1.

In this embodiment, when viewed in a side view (i.e., when viewed from its side), a first edge section (ES1 of FIG. 2), a middle section (MS of FIG. 2), and a second edge section (ES2 of FIG. 2) may be defined (e.g., sequentially defined) on the display panel 520 in the first direction DR1. In this embodiment, one portion of the display panel 520 corresponding to each of the first and second edge sections may have a bent shape with respect to one portion, corresponding to the middle section, of the display panel 520. The bent shape of the display panel 520 will be described in more detail with reference to FIG. 2.

The backlight unit 500 is received in the receiving member 580 to output light toward the display panel 520. In this embodiment, the backlight unit (backlight assembly) 500 may include a first light emitting unit LS1, a second light emitting unit LS2, a light guide plate 550, a reflective member 570 and optical sheets 540.

Each of the first and second light emitting units LS1 and LS2 emits light. In this embodiment, each of the first and second light emitting units LS1 and LS2 may include a printed circuit board PB and light sources LG mounted on the printed circuit board PB to generate the light, and each of the light sources LG may include a plurality of light emitting diode packages.

The first light emitting unit LS1 may be disposed adjacent to one side of the light guide plate 550, and the second light emitting unit LS2 may be disposed adjacent to the other side of the light guide plate 550. Also, the light generated from the first light emitting unit LS1 is incident to the light guide plate 550 through a first incident surface S1, and the light generated from the second light emitting unit LS2 is incident to the light guide plate 550 through a second incident surface S2 (see FIG. 2).

The reflective member 570 includes a light reflecting material such as aluminum, and is disposed between the bottom part 581 of the receiving member 580 and the light guide plate 550. The reflective member 570 reflects the light generated from the first and second light emitting units LS1 and LS2 toward the light guide plate 550.

The optical sheets 540 are disposed between the display panel 520 and the light guide plate 550. In this embodiment, the optical sheets 540 may include a diffusion sheet and a prism sheet. The prism sheet collects the light emitted from the light guide plate 550 in the front direction of the display panel 520, and the diffusion sheet diffuses the collected light.

In this embodiment, both end portions of the optical sheets 540 may be inserted into a receiving groove 530H defined at an inner side of the mold frame 530. Accordingly, an optical distance between the optical sheets 540 and the display panel 520 and an optical distance between the optical sheets 540 and the light guide plate 550 may be maintained.

The mold frame 530 is disposed on borders of the backlight unit 500, and the display panel 520 is disposed on the mold frame 530. The mold frame 530 is disposed between the display panel 520 and the backlight unit 500, and couples the display panel 520 to the backlight unit 500.

The first and second support members 560 and 565 are disposed on the mold frame 530. Each of the first and second support members 560 and 565 extends in the second direction DR2, and the first and second support members 560 and 565 are positioned in one-to-one correspondence to the first and second light emitting units LS1 and LS2.

In this embodiment, the first and second support members 560 and 565 may have a light reflecting property. For example, each of the first and second support members 560 and 565 may include a white plastic material, or the surface of each of the first and second support members 560 and 565 may be coated with a white pigment.

In this embodiment, each of the first and second support members 560 and 565 supports the gap between the display panel 520 and the backlight unit 500, more specifically, the gap between the display panel 520 and the mold frame 530. The first and second support members 560 and 565 are not provided corresponding to all the sections of the display panel 520, but may be provided corresponding to some sections of the display panel 520. Accordingly, the spacing distance between the display panel 520 and the backlight unit 500 in some sections of the display panel 520 is different from the spacing distances between the display panel 520 and the backlight unit 500 in other sections of the display panel 520. This will be described in more detail with reference to FIG. 2.

The first adhesion member AS1 is disposed between the first support member 560 and the display panel 520, and the first adhesion member AS1 attaches the display panel 520 to the first support member 560. Also, the second adhesion member AS2 is disposed between the second support member 565 and the display panel 520, and the second adhesion member AS2 attaches the display panel 520 to the second support member 565. Accordingly, the display panel 520 may be fixed to the first and second support members 560 and 565 by the first and second adhesion members AS1 and AS2 and maintain the shape thereof.

In this embodiment, each of the first and second adhesion members AS1 and AS2 may be a double-sided adhesive tape. In another embodiment, the first and second adhesion members AS1 and AS2 may be adhesives such as resin.

Figure 2:
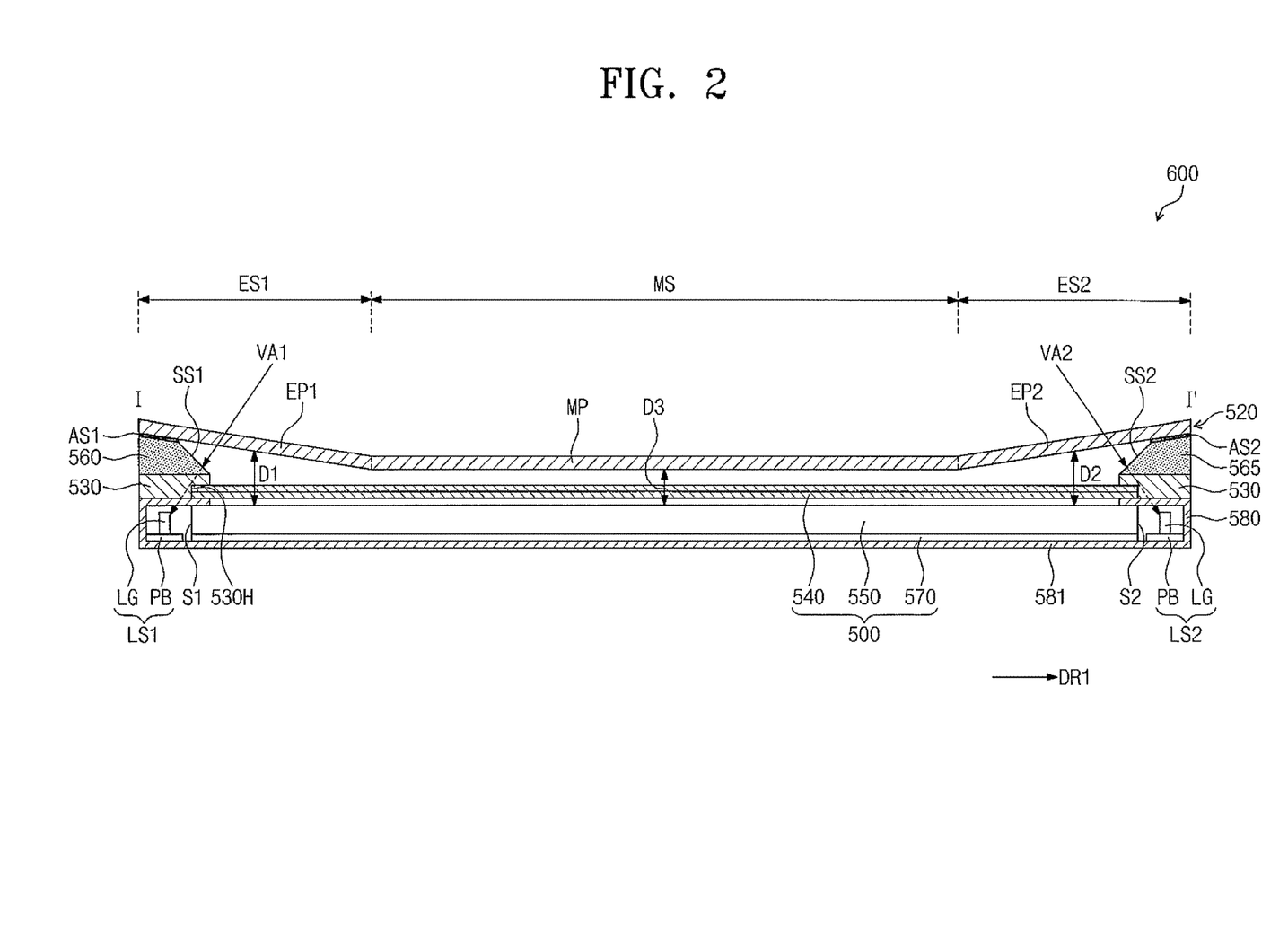
FIG. 2 is a cross-sectional view illustrating a cross-sectional surface taken along line I-I' of FIG. 1.

FIG. 2 is a cross-sectional view illustrating a cross-sectional surface taken along line I-I' of FIG. 1.

Referring to FIGS. 1 and 2, when viewed in a side view, a first edge section ES1, a middle section MS, and a second edge section ES2 are sequentially defined in the first direction DR1 on the display panel 520. In this case, the display panel 520 includes a first edge part EP1 corresponding to the first edge section ES1, a second edge part EP2 corresponding to the second edge section ES2, and a middle part MP corresponding to the middle section MS.

The light guide plate 550 of the backlight unit 500 has a flat shape over all the sections of the display panel 520 when viewed in a side view. That is, the light guide plate 550 has a flat shape, when viewed in a side view, corresponding to the first edge section ES1, the second edge section ES2, and the middle section MS.

The first support member 560 is disposed between the first edge part EP1 and the mold frame 530, and the second support member 565 is disposed between the second edge part EP2 and the mold frame 530. That is, the first and second support members 560 and 565 are positioned corresponding to the first and second edge sections ES1 and ES2, but the first and second support members 560 and 565 are not positioned corresponding to the middle section MS.

According to the above-mentioned structures of the first and second support members 560 and 565, when viewed in a side view, each of the first and second edge parts EP1 and EP2 may have a shape bent with respect to the middle part MP. In this embodiment, when viewed in a side view, each of the first and second edge parts EP1 and EP2 may have a shape bent with respect to the middle part MP.

When a first spacing distance D1 between the display panel 520 and the light guide plate 550 in the first edge section ES1, a second spacing distance D2 between the display panel 520 and the light guide plate 550 in the second edge section ES2, and a third spacing distance D3 between the display panel 520 and the light guide plate 550 in the middle section MS are defined, each of the first and second spacing distances D1 and D2 is greater than the third spacing distance D3.

In this embodiment, the first support member 560 has a first inclined surface SS1, and the second support member 565 has a second inclined surface SS2. The first inclined surface SS1 inclines (e.g., down-slopes) toward the middle part MP when viewed in a side view, and the second inclined surface SS2 inclines (e.g., down-slopes) toward the middle part MP when viewed in a side view.

The effect of the above-mentioned structure of the display device 600 will be described in the following. It is assumed that a user views the first edge part EP1 at a first viewing angle VA1 in the first edge part ES1. Unlike an embodiment of the inventive concept, when the first and second support members 560 and 565 are not provided in the display device 600, the first viewing angle VA1 may face the light source LG of a first light emitting unit LS1, and accordingly, the light source LG is viewed at the first viewing angle VA1, and thus edge light leakage may occur in the first edge section ES1. However, in an embodiment of the inventive concept, the light source LG of the first light emitting unit LS1 is occluded by the first support member 560 at the first viewing angle. As a result, the light source LG is prevented from being viewed in the first edge section ES1. Thus, the edge light leakage does not occur.

Also, since the first support member 560 has a light reflecting property such that the first inclined surface SS1 functions as a reflection surface, the light provided from the outside toward the first inclined surface SS1 along the first viewing angle VA1 is reflected at the first inclined surface SS1. Accordingly, the degree that the first support member 560 is viewed by a user at the first viewing angle VA1 may be reduced or minimized.

Like the first support member 560, the light source of the second light emitting unit LS2 may be occluded by the second support member 565 at the second viewing angle VA2. Accordingly, the light source LG of the second light emitting unit LS2 is prevented from being viewed at the second viewing angle VA2, and thus the occurrence of the edge light leakage is prevented in the second edge section ES2.

Also, when the first and second support members 560 and 565 are not provided in the display device 600 unlike an embodiment of the inventive concept, the size of the non-display area NDA of the display panel 520 corresponding to the first and second edge sections ES1 and ES2 may be increased in order to prevent the occurrence of the edge light leakage in each of the first and second edge sections ES1 and ES2. However, as described above in detail, in an embodiment of the inventive concept, the edge light leakage may be prevented by using the first and second support members 560 and 565. Accordingly, the size of the non-display area NDA of the display panel 520 is not required to be increased in order to prevent the edge light leakage, and thus the size of the non-display area NDA may be reduced or minimized.

Figure 3:
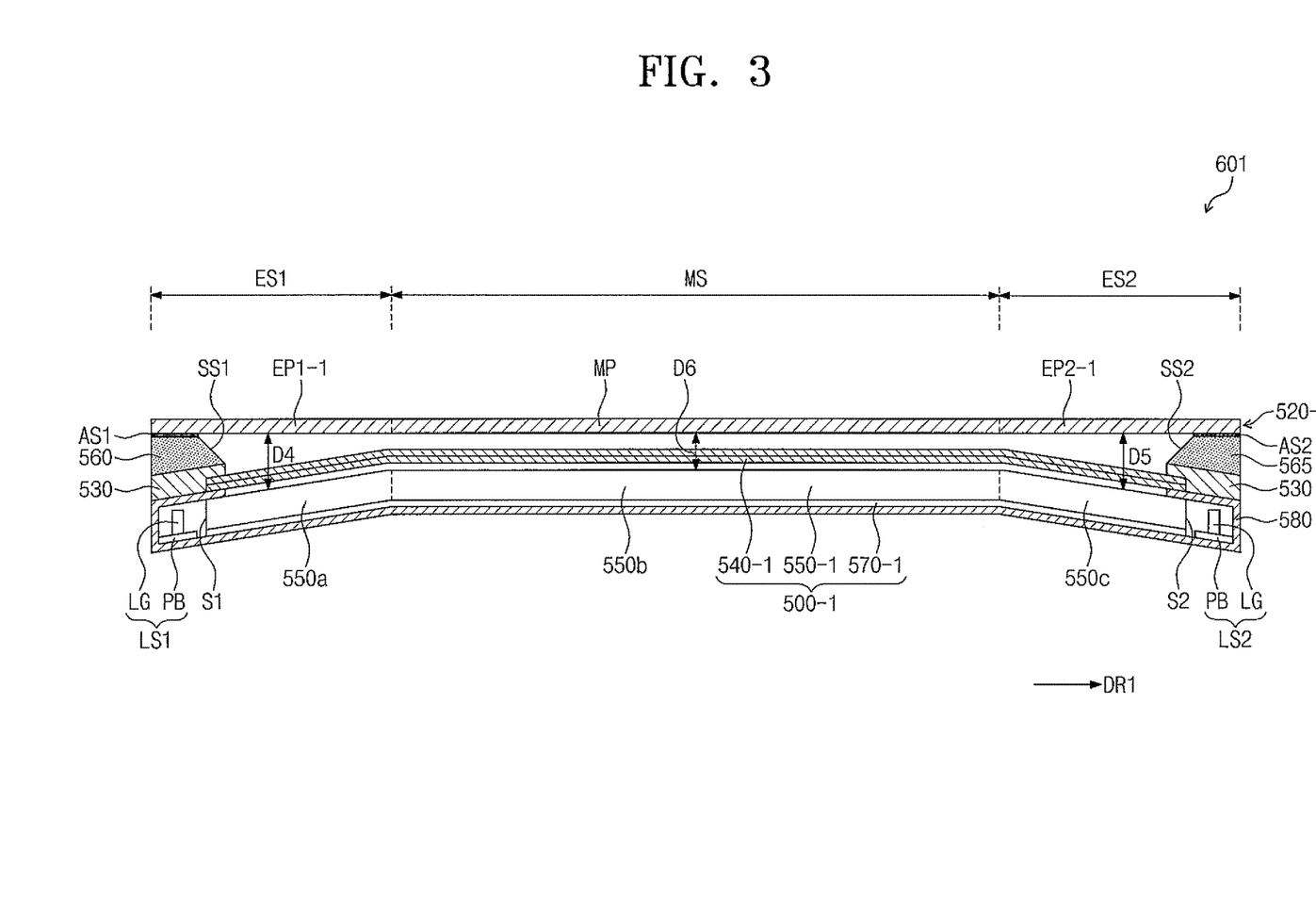
FIG. 3 is a cross-sectional view of a display device according to an embodiment of the inventive concept.

FIG. 3 is a cross-sectional view of a display device according to another embodiment of the inventive concept. In describing FIG. 3, previously described components will be designated by the same reference numerals, and overlapping descriptions thereof may not be provided.

Referring to FIG. 3, a display device 601 includes a receiving member 580, a display panel 520-1, a backlight unit 500-1, a mold frame 530, a first support member 560, a second support member 565, a first adhesion member AS1 and a second adhesion member AS2.

In this embodiment, the display panel 520-1, when viewed in a side view, has a flat shape over the first edge section ES1, the middle section MS, and the second edge section ES2. More specifically, the display panel 520-1 includes a first edge part EP1-1 corresponding to the first edge section ES1, a second edge part EP2-1 corresponding to the second edge section ES2, and a middle part MP corresponding to the middle section MS. The first and second edge parts EP1-1 and EP2-1 are not bent, and the first edge part EP1-1, the middle part MP, and the second edge part EP2-1 have straight and flat shapes when viewed in a side view.

In this embodiment, the backlight unit 500-1 has a partially bent shape. More specifically, a light guide plate 550-1, optical sheets 540-1, and a reflective sheet 570-1 of the backlight unit 500-1 respectively have shapes bent in a direction away from the display panel 520-1 in each of the first and second edge sections ES1 and ES2.

More specifically, the light guide plate 550-1 will be described as an example. The light guide plate 550-1 includes a first light guiding part 550a overlapping the first edge part EP1-1, a second light guiding part 550c overlapping the second edge part EP2-1, and a middle light guide part 550b overlapping the middle part MP. In this case, when viewed in a side view, each of the first and second light guide parts 550a and 550c are bent in directions away from the display panel 520-1 with respect to the middle light guide part 550b.

The first support member 560 is disposed between the first edge part EP1-1 and the mold frame 530, and the second support member 565 is disposed between the second edge part EP2-1 and the mold frame 530. That is, the first and second support members 560 and 565 are positioned corresponding to the first and second edge sections ES1 and ES2, but the first and second support members 560 and 565 are not positioned corresponding to the middle section MS.

According to the structures of the above-mentioned first and second support members 560 and 565, when a fourth spacing distance D4 between the first edge part EP1-1 and the first light guide part 550a, a fifth spacing distance D5 between the second edge part EP2-1 and the second light guide part 550c, and a sixth spacing distance D6 between the middle part MP and the middle light guide part 550b are defined, each of the fourth and fifth spacing distances D4 and D5 is greater than the sixth spacing distance D3.

Similar to the embodiment described with reference to FIG. 2, when a user views the display panel 520-1 at inclined viewing angles, from a side view, in the first and second edge sections ES1 and ES2, light sources LG of first and second light emitting units LS1 and LS2 are occluded by the first and second support members 560 and 565 at the viewing angles. Accordingly, in each of the first and second edge sections ES1 and ES2, the occurrence of edge light leakage may be prevented.

Figure 4:
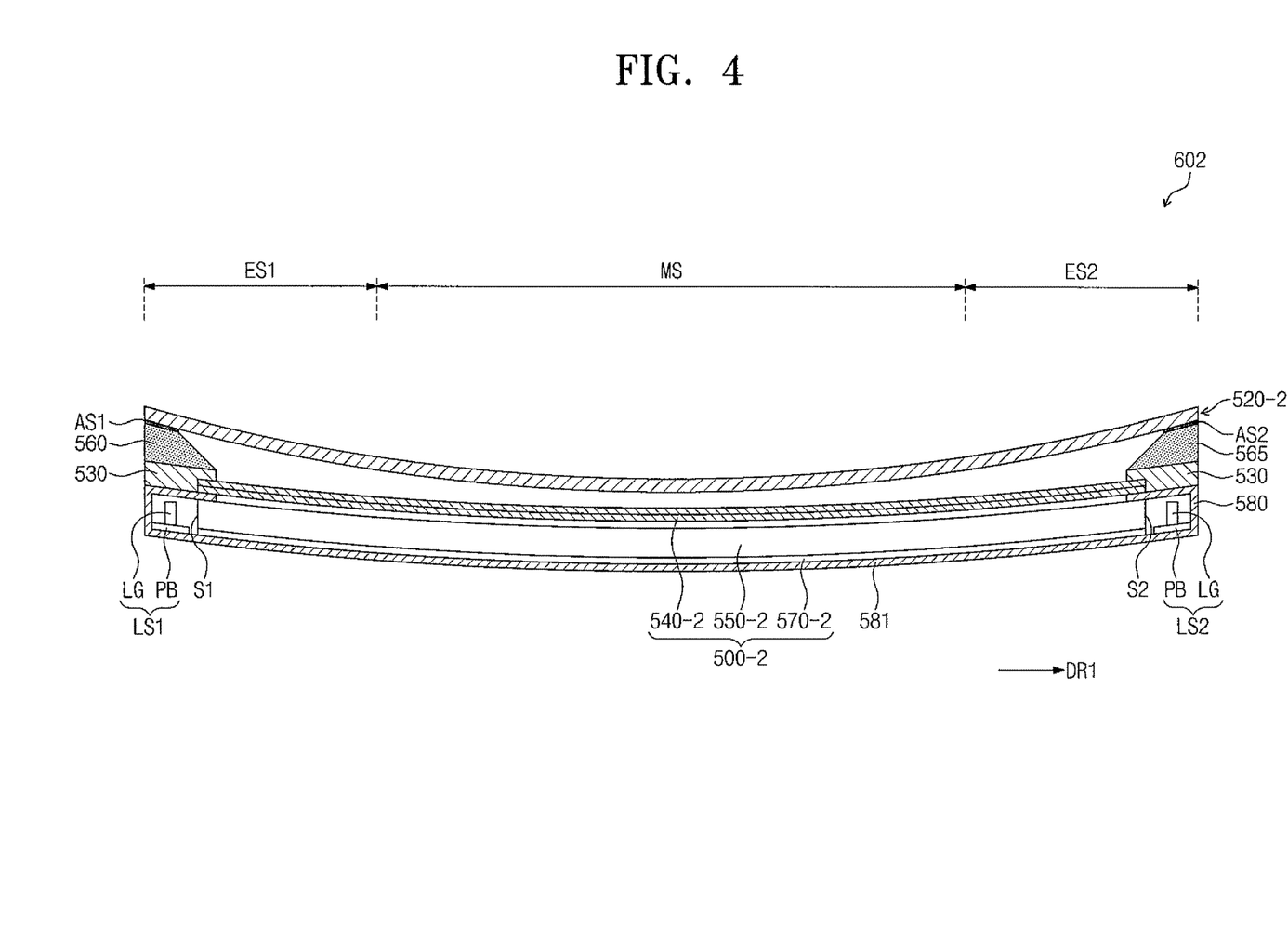
FIG. 4 is a cross-sectional view of a display device according to another embodiment of the inventive concept.

FIG. 4 is a cross-sectional view of a display device according to another embodiment of the inventive concept. In describing FIG. 4, previously described components will be designated by the same reference numerals, and overlapping descriptions thereof may not be provided.

Referring to FIG. 4, a display device 602 includes a receiving member 580, a display panel 520-2, a backlight unit 500-2, a mold frame 530, a first support member 560, a second support member 565, a first adhesion member AS1 and a second adhesion member AS2.

The display panel 520-2, when viewed in a side view, has a shape convexly bent toward a bottom part 581 of the receiving member 580 over all sections. Also, each of optical sheets 540-2, a light guide plate 550-2, and a reflective member 570-2 of the backlight unit 500-2 has a shape convexly bent toward the bottom part 581 over all the sections.

In this embodiment, the display panel 520-2 is bent in a first radius of curvature, and each of the optical sheets, the light guide plate 550-2, and the reflective member 570-2 is bent in a second radius of curvature greater than the first radius of curvature.

The first support member 560 is disposed between a part corresponding to a first edge section ES1 of the display panel 520-2 and the mold frame 530, and the second support member 565 is disposed between a part corresponding to a second edge section ES2 of the display panel 520-2 and the mold frame 530.

According to the above-mentioned structures of the first and second support members 560 and 565, the spacing distance between the display panel 520-2 and the light guide plate 550-2 in each of the first and second edge sections ES1 and ES2, is greater than the spacing distance between the display panel 520-2 and the light guide plate 550-2 in the middle section MS.

Accordingly, similar to the embodiment described with reference to FIG. 2, when a user views the display panel 520-2 at inclined direction viewing angles, when viewed in a side view, in the first and second edge sections ES1 and ES2, light sources LG of first and second light emitting units LS1 and LS2 are occluded by the first and second support members 560 and 565 at the viewing angles, and thus the edge light leakage may be prevented.

Figure 5:
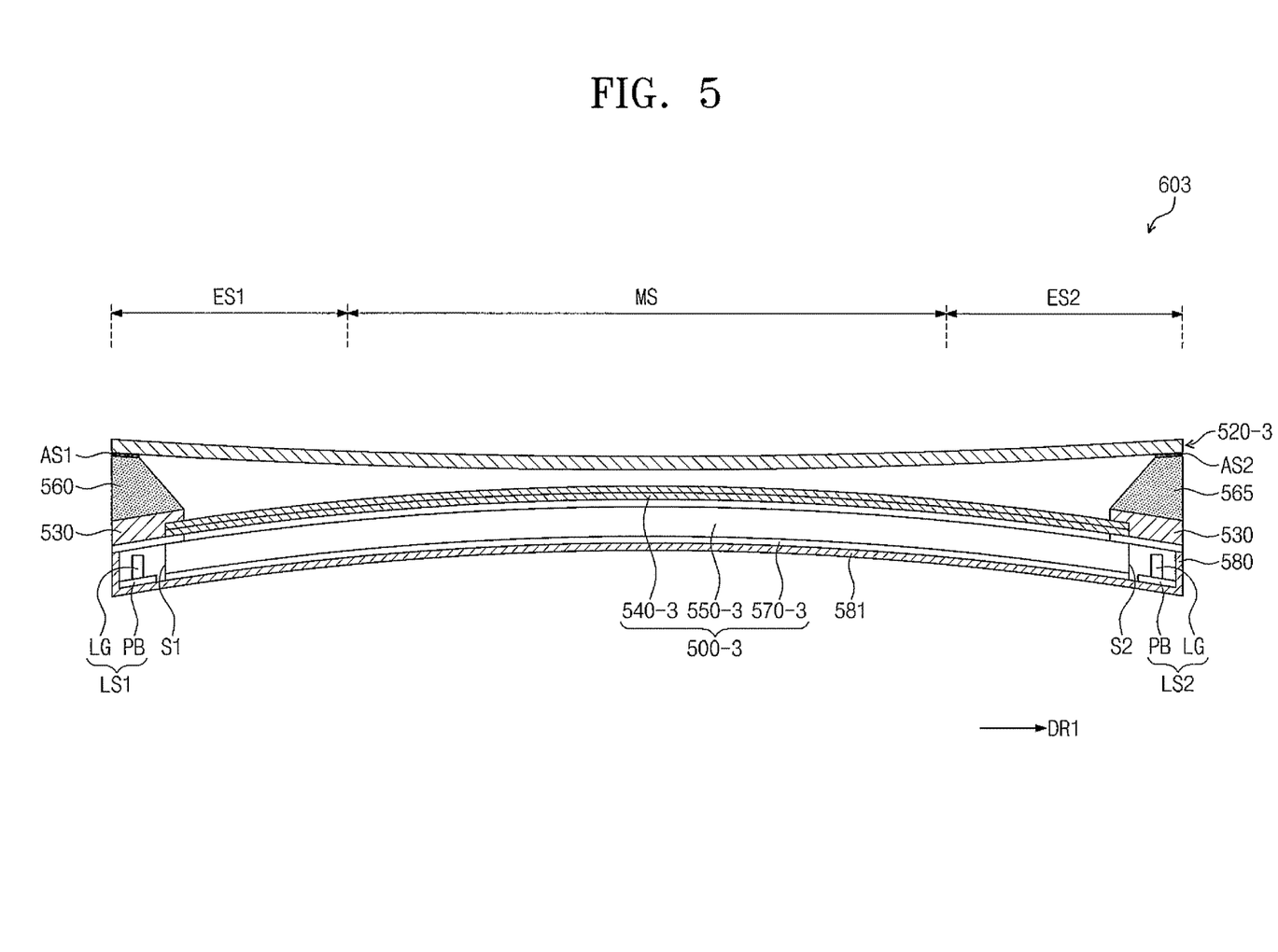
FIG. 5 is a cross-sectional view of a display device according to another embodiment of the inventive concept.

FIG. 5 is a cross-sectional view of a display device according to another embodiment of the inventive concept. In describing FIG. 5, previously described components will be designated by the same reference numerals, and overlapping descriptions thereof may not be provided.

Referring to FIG. 5, a display device 603 includes a receiving member 580, a display panel 520-3, a backlight unit 500-3, a mold frame 530, a first support member 560, a second support member 565, a first adhesion member AS1 and a second adhesion member AS2.

In this embodiment, the display panel 520-3, when viewed in a side view, has a shape convexly bent toward a bottom part 581 of the receiving member 580 over all sections. Also, each of optical sheets 540-3, a light guide plate 550-3, and a reflective member 570-3 of the backlight unit 500-3 has a shape, when viewed in a side view, convexly bent toward the display panel 520-3 over all the sections.

The first and second support members 560 and 565 are disposed, in first and second edge sections, between the display panel 520-3 and the mold frame 530. Accordingly, the spacing distance between the display panel 520-3 and the light guide plate 550-3 in each of the first and second edge sections ES1 and ES2, is greater than the spacing distance between the display panel 520-3 and the light guide plate 550-3 in the middle section MS.

Accordingly, similar to the embodiment described with reference to FIG. 2, when a user views the display panel 520-3 at inclined direction viewing angles, when viewed in a side view, in the first and second edge sections ES1 and ES2, light sources LG of first and second light emitting units LS1 and LS2 are occluded by the first and second support members 560 and 565 at the viewing angles, and thus the edge light leakage may be prevented.

Figure 6:
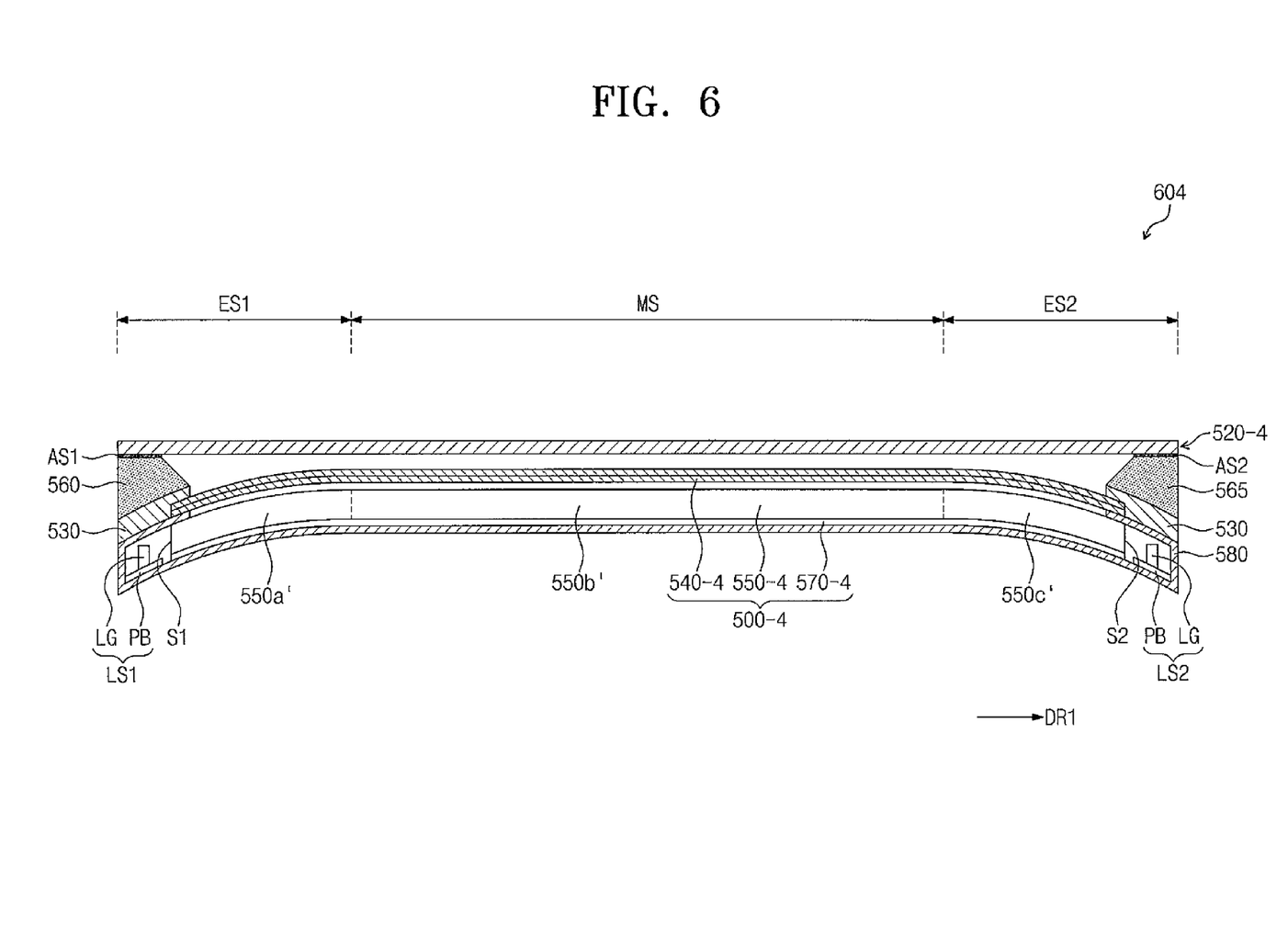
FIG. 6 is a cross-sectional view of a display device according to another embodiment of the inventive concept.

FIG. 6 is a cross-sectional view of a display device according to another embodiment of the inventive concept. In describing FIG. 6, previously described components will be designated by the same reference numerals, and overlapping descriptions thereof may not be provided.

Referring to FIG. 6, a display device 604 includes a receiving member 580, a display panel 520-4, a backlight unit 500-4, a mold frame 530, a first support member 560, a second support member 565, a first adhesion member AS1 and a second adhesion member AS2.

In this embodiment, the display panel 520-4, when viewed in a side view, has a flat shape over a first edge section ES1, a middle section MS, and a second edge section ES2. Also, the backlight unit 500-4 has a partially bent shape. More specifically, a light guide plate 550-4, optical sheets 540-4, and a reflective sheet 570-4 of the backlight unit 500-4 respectively have shapes convexly bent in a direction away from the display panel 520-4 in the first and second edge sections ES1 and ES2.

The light guide plate 550-4 will be described as an example. The light guide plate 550-4 includes a first light guiding part 550a' corresponding to the first edge section ES1, a second light guiding part 550c' corresponding to the second edge section ES2, and a middle light guide part 550b' corresponding to the middle section MS. In this case, each of the first and second light guide parts 550a' and 550c' may be convexly bent in directions away from the display panel 520-4 with respect to the middle light guide part 550b'.

The first and second support members 560 and 565 are disposed, in first and second edge sections ES1 and ES2, between the display panel 520-4 and the mold frame 530. Accordingly, the spacing distance between the display panel 520-4 and the light guide plate 550-4 in each of the first and second edge sections ES1 and ES2, is greater than the spacing distance between the display panel 520-4 and the light guide plate 550-4 in the middle section MS.

Accordingly, similar to the embodiment described with reference to FIG. 2, when a user views the display panel 520-4 at oblique viewing angles, from a side view, in the first and second edge sections ES1 and ES2, light sources LG of first and second light emitting units LS1 and LS2 are occluded by the first and second support members 560 and 565 at the viewing angles, and thus the edge light leakage may be prevented.

Figure 7:
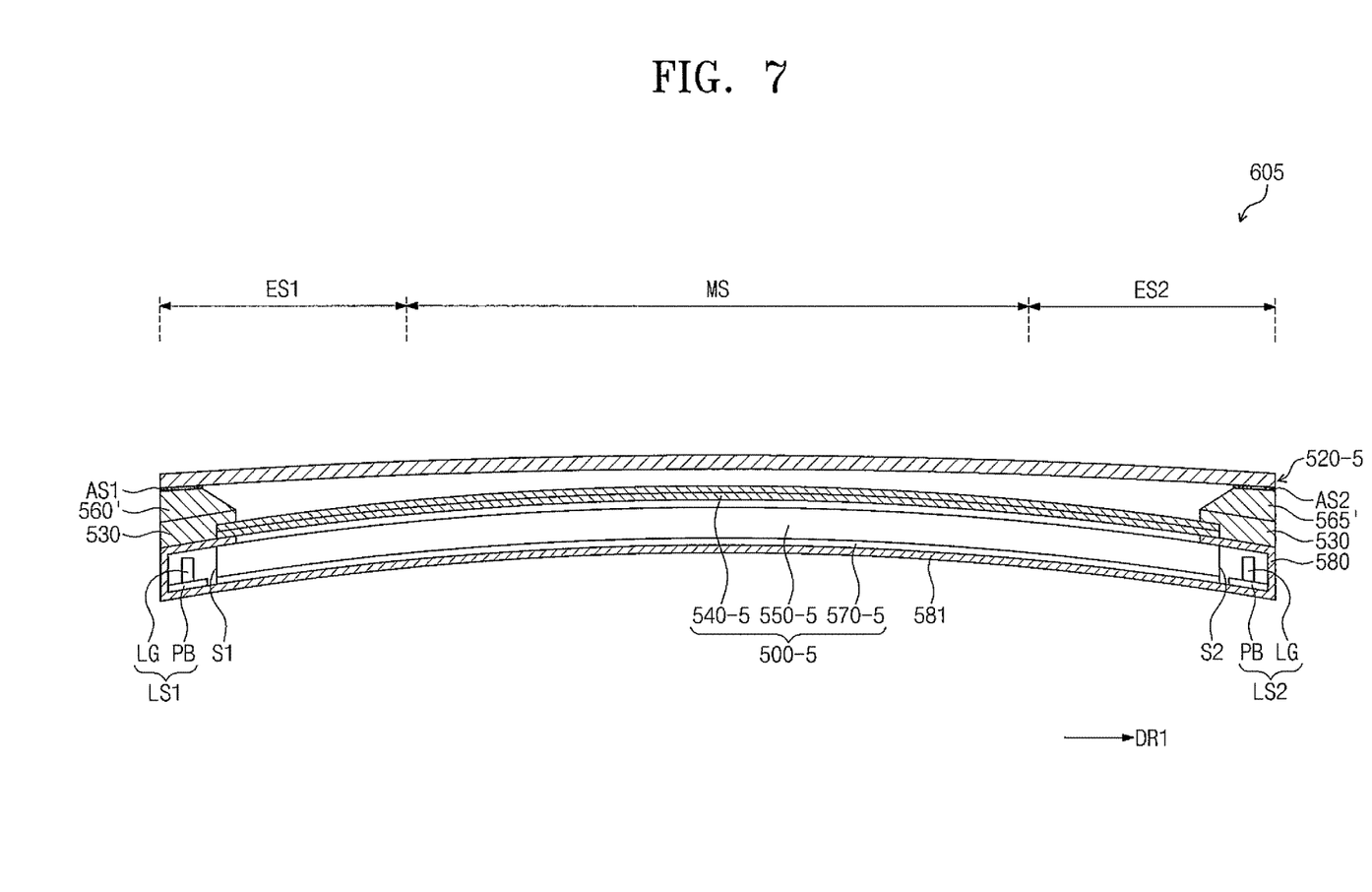
FIG. 7 is a cross-sectional view of a display device according to another embodiment of the inventive concept.

FIG. 7 is a cross-sectional view of a display device according to another embodiment of the inventive concept. In describing FIG. 7, previously described components will be designated by the same reference numerals, and overlapping descriptions thereof may not be provided.

Referring to FIG. 7, a display device 605 includes a receiving member 580, a display panel 520-5, a backlight unit 500-5, a mold frame 530, a first support member 560', a second support member 565', a first adhesion member AS1 and a second adhesion member AS2.

In this embodiment, the first and second support members 560' and 565' may have shapes integrated with the mold frame 530. For example, the first and second support members 560' and 565' and the mold frame 530 are provided as an integral (continuous) body. Accordingly, when the first and second support members 560' and 565' include a white plastic material having a light reflecting property, the mold frame 530 may include the white plastic material.

The display panel 520-5, when viewed in a side view, has a shape convexly bent toward a bottom part 581 of the receiving member 580 over all sections. Also, each of optical sheets 540-5, a light guide plate 550-5, and a reflective member 570-5 of the backlight unit 500-5 has a shape convexly bent toward the bottom part 581 over all the sections.

In this embodiment, the display panel 520-5 is bent in a first radius of curvature, and when each of the optical sheets 540-5, the light guide plate 550-5, and the reflective member 570-5 is bent in a second radius of curvature, the first radius of curvature may be greater than the second radius of curvature.

The first and second support members 560' and 565' are disposed, in first and second edge sections ES1 and ES2, between the display panel 520-5 and the mold frame 530. Accordingly, the spacing distance between the display panel 520-5 and the light guide plate 550-5 in each of the first and second edge sections ES1 and ES2, is greater than the spacing distance between the display panel 520-5 and the light guide plate 550-5 in a middle section MS.

Accordingly, similar to the embodiment described with reference to FIG. 2, when a user views the display panel 520-2 at oblique direction viewing angles, from a side view, in the first and second support members 560' and 565', light sources LG of first and second light emitting units LS1 and LS2 are occluded by the first and second support members 560' and 565' at the viewing angles, and thus the edge light leakage may be prevented.

According to embodiments of the inventive concept, a light source of a backlight unit may be prevented from being viewed at an inclined direction viewing angle, and thus the occurrence of light leakage at an edge of a display panel may be prevented.

Also, since a non-display area of the display panel is not necessarily expanded to prevent the light leakage at an edge of the display panel, the volume of a display device may be reduced or minimized.

It will be apparent to those skilled in the art that various modifications and variations can be made in the inventive concept. Thus, it is intended that the inventive concept covers the modifications and variations of this disclosure provided they come within the scope of the appended claims and their equivalents. Therefore, the scope of the inventive concept is defined not by the detailed description of the inventive concept but by the appended claims and equivalents thereof.

What is claimed is:

1. A display device comprising:
   a display panel configured to display an image, with a first edge section, a middle section, and a second edge section-defined on the display panel;
   a backlight unit configured to output light toward the display panel, the backlight unit located in the first edge section, the middle section, and the second edge section; and
   support members between the display panel and the backlight unit, respective support members located in the first and second edge sections and configured to space apart the display panel from the backlight unit in the first and second edge sections,
   wherein portions of the backlight unit in each of the first and second edge sections are bent in a direction away from the display panel such that a spacing distance between the display panel and the backlight unit in each of the first and second edge sections is greater than a spacing distance between the display panel and the backlight unit in the middle section.

2. The display device of claim 1, wherein the backlight unit comprises:
   a light emitting unit configured to emit the light;
   a light guide plate configured to guide the light provided from the light emitting unit; and
   optical sheets between the display panel and the light guide plate,
   wherein a spacing distance between the display panel and the light guide plate in each of the first and second edge sections is greater than a spacing distance between the display panel and the light guide plate in the middle section by utilizing a corresponding support member from among the support members.

3. The display device of claim 2, wherein the light emitting unit comprises a plurality of light emitting units, and the plurality of light emitting units are adjacent to both sides of the light guide plate in one-to-one correspondence.

4. The display device of claim 3, wherein the support members are positioned to be in one-to-one correspondence to the plurality of light emitting units.

5. The display device of claim 2,
wherein the display panel comprises:
a first edge part corresponding to the first edge section;
a second edge part corresponding to the second edge section; and
a middle part corresponding to the middle section, and the support members comprise:
a first support member spacing the first edge part from the light guide plate; and
a second support member spacing the second edge part from the light guide plate.

6. The display device of claim 5, wherein the first support member comprises a first inclined surface inclined toward the middle part when viewed in a side view, and the second support member comprises a second inclined surface inclined toward the middle part when viewed in a side view.

7. The display device of claim 5, further comprising a mold frame between each of the first and second support members and the backlight unit and coupled to the optical sheets.

8. The display device of claim 7, wherein the support members and the mold frame are provided as an integrate body.

9. The display device of claim 5, wherein each of the first edge part and the second edge part has a shape bent with respect to the middle part when viewed in a side view.

10. The display device of claim 9, wherein the light guide plate has a flat shape over the first edge section, the middle section, and the second edge section when viewed in a side view.

11. The display device of claim 5, wherein the display panel has a flat shape over the first edge section, the middle section, and the second edge section when viewed in a side view.

12. The display device of claim 11, wherein the light guide plate comprises:
a first light guide part overlapping the first edge part;
a second light guide part overlapping the second edge part; and
a middle light guide part overlapping the middle part,
wherein each of the first and second light guide parts has a shape bent with respect to the middle light guide part when viewed in a side view.

13. The display device of claim 12, wherein the first light guide part and the second light guide part are each bent in a direction away from the display panel.

14. The display device of claim 5, further comprising a receiving member comprising a bottom part and side walls extending from the bottom part, and the receiving member configured to receive the display panel and the backlight unit,
wherein the display panel, when viewed in a side view, is convexly bent toward the bottom part of the receiving member, and the light guide plate is convexly bent toward the display panel when viewed in a side view.

15. The display device of claim 5 further comprising a receiving member comprising a bottom part and side walls extending from the bottom part, and the receiving member configured to receive the display panel and the backlight unit,
wherein the display panel and the light guide plate, when viewed in a side view, have shapes convexly bent in a direction away from the bottom part of the receiving member, and a radius of curvature of the display panel is greater than that of the light guide plate.

16. The display device of claim 5 further comprising a receiving member comprising a bottom part and side walls extending from the bottom part, and the receiving member configured to receive the display panel and the backlight unit,
wherein the display panel and the light guide plate, when viewed in a side view, have shapes convexly bent toward the bottom part of the receiving member, and a radius of curvature of the light guide plate is greater than that of the display panel.

17. The display device of claim 1, wherein the support members have a light reflecting property.

18. The display device of claim 1, further comprising an adhesion member configured to attach each of the support members to the display panel.

19. A display device comprising:
a display panel configured to display an image and comprising a middle part, a first edge part connected to one end of the middle part, and a second edge part connected to a second end of the middle part;
a backlight unit configured to output light toward the display panel; and
support members between the display panel and the backlight unit overlapped with the first and second edge parts, the support members configured to space apart the display panel from the backlight unit,
wherein a spacing distance between each of the respective first and second edge parts of the display panel and the backlight unit is greater than a spacing distance between the middle part of the display panel and the backlight unit, and
wherein, a first support member comprises a first inclined surface inclined toward the middle part when viewed in a side view, and a second support member comprises a second inclined surface inclined toward the middle part when viewed in a side view.

* * * * *